United States Patent [19]

Kojima et al.

[11] 4,433,897

[45] Feb. 28, 1984

[54] LENS SUPPORTING ASSEMBLY

[75] Inventors: Masaaki Kojima, Tokyo; Takayuki Suzuki; Hiromichi Abe, both of Kawasaki, all of Japan

[73] Assignee: Nippon Kogaku K.K., Tokyo, Japan

[21] Appl. No.: 287,106

[22] Filed: Jul. 27, 1981

[30] Foreign Application Priority Data

Aug. 8, 1980 [JP] Japan ............................... 55/108205

[51] Int. Cl.³ ............................................ G02B 7/02
[52] U.S. Cl. ...................................... 350/252; 350/242
[58] Field of Search ................................ 350/242, 252

[56] References Cited

U.S. PATENT DOCUMENTS 705,706  7/1902  Richmond ............................ 350/252

3,904,276  9/1975  Whitaker et al. .................... 350/252

FOREIGN PATENT DOCUMENTS 259691  10/1926  United Kingdom ................ 350/252

*Primary Examiner*—William H. Punter
*Attorney, Agent, or Firm*—Shapiro and Shapiro

[57] ABSTRACT

Disclosed is a lens supporting assembly having a lens fitting in a cylindrical section of a supporting frame against a retaining flange. The lens is held in place by a keep ring and the keep ring is held against the lens by calking projections circumferentially spaced around the cylindrical section of the frame. The calking projections are formed by suitably deforming portions of the frame itself.

7 Claims, 5 Drawing Figures

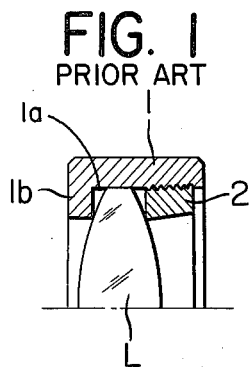
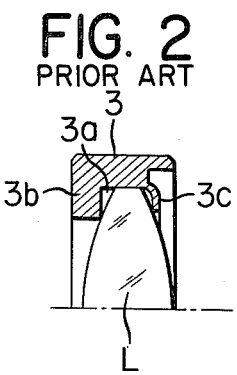
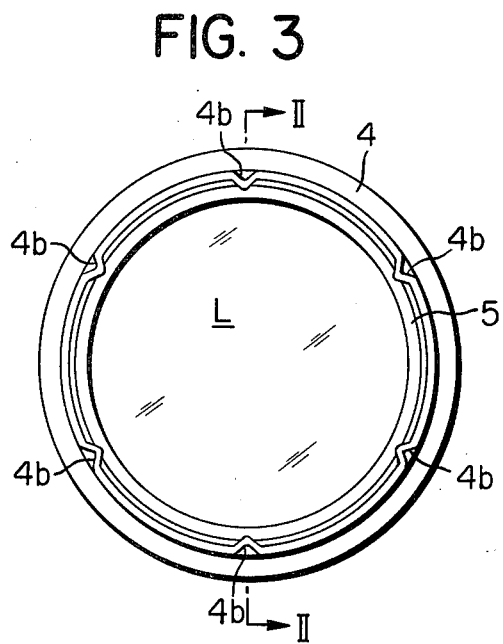
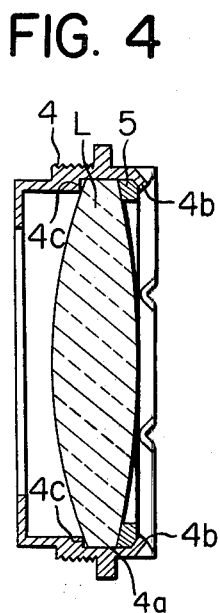
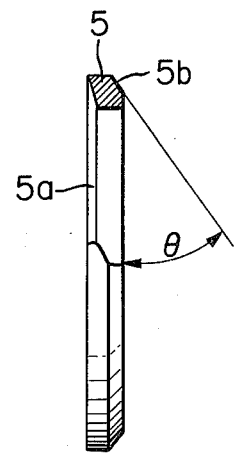

LENS SUPPORTING ASSEMBLY

BACKGROUND OF THE INVENTION

This invention relates to a supporting assembly for holding an optical lens.

Known lens supporting assemblies may, for example, comprise a cylindrical supporting frame in which the lens sits and which has a lens-retaining flange at one end. The lens may be held against the flange, for example, by a keep ring that screws into the support ring, or by calking over the end portion of the support frame. The former arrangement requires accurately formed screw threads and is relatively costly to manufacture, while the latter arrangement has strength limitations and can lead to lens damage when it is necessary to remove the lens from the supporting frame.

SUMMARY OF THE INVENTION

The present invention provides a lens supporting assembly which can reliably support a lens without causing strain to be created in the lens and which enables mounting and dismounting of the lens without injuring the surface thereof.

Broadly stated, the invention provides a lens supporting assembly wherein a lens fits in the cylindrical section of a supporting frame against a retaining flange. The lens is held in place by a keep ring and the keep ring is held against the lens by calking projections circumferentially spaced around the cylindrical section of the frame. The calking projections conveniently may be formed by suitably deforming portions of the frame itself.

The invention will become more fully apparent from the following detailed description and claims taken in conjunction with the attached drawings.

BRIEF DESCRIPTION OF DRAWINGS

FIGS. 1 and 2 are cross-sectional views showing prior art type lens supporting assemblies;

FIG. 3 is a front view of a lens supporting assembly in accordance with the present invention;

FIG. 4 is a cross-sectional view along line II—II of FIG. 3; and

FIG. 5 is a partly cross-sectional view of a keep ring.

DESCRIPTION OF PRIOR ART

Prior art lens supporting assemblies may, for example, comprise a supporting frame 1 and a keep ring 2 as shown in FIG. 1 of the drawings, or a supporting frame 3 having a calking projection 3c as shown in FIG. 2 of the drawings.

In the FIG. 1 arrangement, a lens L is inserted in a cylindrical containing section 1a of a supporting frame 1, and is held between a flange 1b projecting from the inner peripheral surface of the containing section, and the keep ring 2 which is threadably engaged in the containing section. This construction requires a number of steps in forming threads in the supporting frame 1 and the keep ring 2, and in threadably inserting the keep ring into the containing section. Also, in order to protect the lens against strain which may harm the optical characteristics thereof, the keep ring 2 must bear uniformly against the entire periphery of the lens. It has proved difficult to provide the accuracy of parts, particularly the accuracy of thread cutting, to ensure such uniformity.

In the FIG. 2 arrangement, lens L is inserted in the cylindrical containing section 3a of the supporting frame 3, and is held between flange 3b and an annular calking portion 3c of the frame, which is bent so as to bear against the entire periphery of the lens. The calking portion may, for example, be formed by machining on a lathe. In this process, the lens L is first inserted into the containing section 3a, and the supporting frame 3 is then chucked to the lathe so that it rotates about the optical axis of the lens. The calking portion 3c, which is initially a tubular projection extending from the end of the containing section 3a, is gradually pressed by a tool, while being rotated, whereby it is bent over the entire periphery thereof. In order to facilitate calking by this method, the thickness of the calking portion 3c should be relatively small. This can lead to strength problems in supporting a relatively heavy lens, and there has been the possibility that slight shocks may cause the calking portion to deform so that the lens becomes disengaged from the supporting frame. Also, to establish calking with a uniform force by the above method, so that no strain may be created in the lens, skill is required of the operator. Further, when the necessity of removing the lens from the supporting frame has occurred, for example, when the calking is to be reformed after a strain is created in the lens, the calking portion must be brough back to its original form. It may be difficult to accomplish this without harming the surface of the lens.

DESCRIPTION OF PREFERRED EMBODIMENT

As shown in FIGS. 3 and 4, a lens supporting frame 4 has a cylindrical containing section 4a, with a flange 4c at one end for supporting an optical lens L. The lens L when fitted in the containing section 4a, is held between a keep ring 5 and the flange, whereby the lens is fixed in the supporting frame. The outside diameter of the keep ring 5 may be substantially equal to that of the lens L, and the keep ring may be closely fitted to the inner wall of the supporting frame. The depth of the containing section 4a may be such that the rim of the containing section projects outwardly of ring 5 by a suitable amount when the lens and ring have been inserted, to enable the rim to be calked over as will be described.

After the lens and the keep ring have been inserted into the supporting frame, the projecting edge of the cylinder may be inwardly bent at a plurality of locations as shown in FIG. 3, whereby circumferentially spaced calking projections 4b are formed. The calking projections are preferably provided at equal angular intervals with respect to the optical center of the lens and the projections press on keep ring 5. Thus, the lens is retained between the keep ring and the flange 4c. The keep ring causes the load from the calking projections to be distributed over the entire periphery of the lens so that substantially no strain occurs in the lens. Removal of the lens from the supporting frame may be accomplished by returning the calking portions 4b to their original form, by the use of a tool or the like, and this can be done without bringing the tool into contact with the lens surface and thus there is a reduced possibility of harming this surface.

Where the calking projections 4b are provided at spaced intervals as in the present embodiment, it is desirable that the projections be provided at at least three locations. It is desirable that the projections, as shown in FIG. 3 be opposed to each other with the optical center of the lens intervening therebetween, and be provided at equal angular intervals with respect to the optical center, so that stress exerted on the lens L will be distributed more uniformly. Also, the calking projections can readily be formed by the use of a small pressure force, even in a relatively thick cylinder edge. Accordingly, where a heavy lens is to be supported, the support structure may have a cylindrical edge portion of increased thickness and/or an increased number of calking projections may be used. Further, the spaced calking projections may be readily returned to their original form when a lens is to be removed from the supporting frame.

FIG. 5 shows a preferred configuration of the keep ring 5 in detail. Surface 5a of the ring, which contacts the lens, has a configuration approximating to the curvature of the lens and may be in intimate contact with the lens surface. Also, this contact surface 5a may have a rough finish so as to provide high friction with respect to the lens. This prevents the lens from rotating about the optical axis. The upper surface of ring 5 may be formed with a chamfered portion 5b so as to facilitate bending of the edge portion of the frame to form the calking projections. The chamfer angle $\theta$ of the chamfered portion 5b may suitably be about 45°.

In order that a uniform load may at all times be transmitted to the lens L, the keep ring 5 may desirably be formed of a material which can withstand a long-period load, which is not readily plastically deformable, and which is elastic to a certain degree. Light aluminum alloys, plastics such as FRP or brass are suitable materials for example.

The supporting assembly of the present invention is not limited to use with a single lens, but may also be used to support a lens construction comprising a plurality of lenses or a cemented lens. Further, flange 4c and ring 5 need not bear directly against the opposite surfaces of the lens. Intermediate bearing rings or the like may, for example, be provided. If a ring of silicone rubber or the like is for example interposed between keep ring 5 and lens L, the friction with the lens will be increased and therefore, in such case, the contact surface 5a will not need to have a rough finish. Further, the interposed ring may have the effect of absorbing shocks.

While only preferred embodiments of the invention have been described herein in detail, the invention is not limited thereby and modifications may be made within the scope of the attached claims.

We claim:

1. An optical lens supporting assembly comprising a support frame having a cylindrical containing section and an internally projecting flange at one end of the containing section, an optical lens fitting in the containing section and having one surface bearing against said flange, a lens keep ring member fitting in the containing section and having one end face bearing against the peripheral edge of the opposite surface of the lens for holding the lens between the flange and said one end face, and means providing an even number of calking projections bearing against the opposite end face of the ring member for holding the ring member against the lens, said even number of calking projections being circumferentially spaced around the containing section at mutually opposed positions and at equal angular intervals with respect to the optical center of the lens.

2. An assembly as claimed in claim 1, wherein the calking projections comprise inwardly bent portions of the containing section.

3. An assembly as claimed in claim 1, wherein at least one of said flange and said keep ring member bears directly against the lens.

4. An assembly as claimed in claim 1, wherein said one end face of said keep ring member comprises a curved surface substantially matching the curvature of the peripheral edge of the other surface of said lens, to provide intimate contact of said end face with said lens.

5. An assembly as claimed in claim 1, wherein said one end face of said keep ring member has a rough finish.

6. An assembly as claimed in claim 1, wherein the opposite end face of said keep ring member has a chamfered portion to facilitate formation of the calking projections.

7. An assembly as claimed in claim 1, wherein said means has six calking projections.

* * * * *